US005423417A

United States Patent [19]

Redekop

[11] Patent Number: 5,423,417

[45] Date of Patent: Jun. 13, 1995

[54] LOG LADDER

[76] Inventor: Stanley W. Redekop, 9650 Bottom Wood Lake Road, Box 808, Winfield, B.C., V0H 2C0, Canada

[21] Appl. No.: 197,607

[22] Filed: Feb. 17, 1994

[30] Foreign Application Priority Data

Feb. 17, 1993 [CA] Canada ................................ 2089780

[51] Int. Cl.[6] ............................................ B65G 25/02

[52] U.S. Cl. ................................ 198/774.2; 198/777; 198/774.1

[58] Field of Search .................. 198/773, 774.1, 774.2, 198/774.3, 777, 443, 444

[56] References Cited

U.S. PATENT DOCUMENTS

| | | | |
|---|---|---|---|
| 1,889,039 | 11/1932 | Quinn | 198/774.3 X |
| 2,995,235 | 8/1961 | Maier, Jr. | 198/774.2 |
| 3,168,190 | 2/1965 | Nienstedt | 198/777 X |
| 4,361,223 | 11/1982 | Johnson | 198/777 X |
| 4,585,114 | 4/1986 | Lilano | 198/774.2 X |
| 5,174,351 | 12/1992 | Lindenblatt et al. | 198/774.1 X |

FOREIGN PATENT DOCUMENTS

| | | | |
|---|---|---|---|
| 0897675 | 1/1982 | U.S.S.R. | 198/774.1 |
| 1542869 | 2/1990 | U.S.S.R. | 198/774.3 |

*Primary Examiner*—James R. Bidwell

*Attorney, Agent, or Firm*—Chernoff, Vilhauer, McClung & Stenzel

[57] ABSTRACT

A log ladder for sorting, feeding and indexing in a downstream direction a stack of logs into a stream of logs has a first notched step and a first set of collectively actuable lift arms pivotable about a first axis, and a second set of collectively actuable lift arms downstream of the first set of lift arms, actuable independently of the first set of collectively actuable lift arms and pivotable about a second axis, the first set of lift arms actuable from a lowered position to a raised position whereby the first set of lift arms are engageable with a log at a first engagement point thereby to raise the log from the stack of logs, the first axis downstream of the first engagement point relative to the direction of movement of said logs in said stream of logs, the first axis generally below the first notched step, the first notched step adapted to receive and hold the stack of logs, the first set of lift arms in the raised position positioning the log so as to deposit the log into a second notched step below the first set of lift arms in the raised position and downstream of the first notched step, the second set of lift arms actuable from a lowered position to a raised position whereby the second set of lift arms are engageable with the log in the second notched step at a second engagement point thereby to raise the log from the second notched step, the second axis downstream of the second engagement point and generally below the second notched step, the second set of lift arms in the raised position positioning the log so as to deposit the log from the log ladder.

10 Claims, 5 Drawing Sheets

LOG LADDER

FIELD OF THE INVENTION

This invention pertains to the field of devices for sorting and indexing cylindrical objects and in particular relates machinery for sorting a pile of logs and indexing those logs into a sequential end-to-end stream of logs.

BACKGROUND OF THE INVENTION

In the log processing environment, there is often a requirement to sort a pile of logs and index those logs so that they can be fed on to a conveyor belt or the like to form a continuous end-to-end chain of logs.

Numerous devices have been tried in the prior art to unscramble or sort, index and feed logs or like elongated objects from a stack of such objects. In the log processing environment generally a stack of logs is placed in contact with an unscrambling or sorting mechanism. The unscrambling or sorting mechanism attempts to disentangle and cull logs from the stack of logs and transport them away from the stack or pile of logs. A feeding and indexing mechanism attempts to transfer the logs one at a time from the unscrambling or sorting mechanism to form a continuous stream of logs moving downstream away from the stack of logs on some conveyancing means such as a conveyor belt.

One type of unscrambing or sorting mechanism is taught by Stelter in U.S. Pat. No. 5,119,930 which issued on Jun. 9, 1992 for a device entitled Quadrant Log Feeder. A movable quadrant having a curved peripheral surface is rotated over a fixed quadrant to raise at least one log from the logs' holding location and to deposit the logs against a conventional type of notched-disc singulator. The notched-disk singulator acts to index the logs one-at-a-time onto a conveyor belt.

Another type of unscrambling or sorting mechanism is a so called "step sorter" which forms part of the combined sorter/indexer mechanism disclosed in Canadian Patent No. 1,277,682 which issued to Interlog AB Sweden for a "Device for Piece Meal Transversal Feed of Longish Objects, Preferably Wood Pieces". A further unscrambling or sorting mechanism forms part of the combined sorter/indexer mechanism disclosed in United Kingdom Patent No. 1,256,509 which issued to Wellman-Cranes Limited for "Improved Means for Unscrambling Elongated Articles". Both of these devices rely on oscillating or translating one set of steps relative to a second set of steps so as to transfer any logs held in one particular step up to the next higher step. In step sorters, if the first stage of the step sorter, that is, the stage which is in contact with a pile of logs, does not on any one cycle pick up a log, then a blank is introduced into the stream of logs moving up the stepped ladder. Because each set of steps moves as a single unit, there is no way to re-engage the first stage of the step sorter with the pile of logs so as to place a log into the blank in the stream of logs.

One type of feeding and indexing machine is illustrated in U.S. Pat. No. 4,911,283 which issued to Hollins on Mar. 27, 1990. An earlier version of this machine is the subject of U.S. Pat. No. 4,624,361 which issued to Hollins on Nov. 25, 1986. U.S. Pat. No. 3,330,401 which issued to Ahlstedt on Jul. 11, 1967 also illustrates a feeding and indexing machine operating on somewhat similar principles to the Hollins device.

The Hollins and Ahlstedt devices feed and index logs which have been sorted from a pile of logs and delivered to their indexing mechanisms as a transversely oriented stream of logs. Both Hollins and Ahlstedt rely on an arm, or transverse array of arms, pivoting about an upstream pivot so as to bring a contact face on the arm or arms against the downstream-most log waiting to be indexed from the feeder queue. The arm or arms pivot in a direction opposite to the direction of movement of the stream of logs. That is, while the stream of transversely oriented logs are moving down the feed queue in, for example, a counter-clockwise direction as viewed from the side of the device, the arm or arms pivot in a clockwise direction.

Hollins indicates that log feeders utilizing the principles set out in his two patents are limited in the range of log sizes that can be accommodated by any one particular log feeder. It has been found that because logs are not of uniform diameter and are often warped and twisted, that log feeders employing the Hollins principle do not consistently feed logs on every cycle of the lift arms. That is, employing lift arms pivoting about an upstream pivot point so as to force the feeder queue to move back upstream, thereby allowing the lifting portion of the lifting arm located downstream of the feeder queue to cull one log (the downstream-most log) from the feeder queue and raise it so that the log can roll clear of the log feeder, does not consistently operate to cull a single log from the feeder queue.

In a log mill environment, it is important to be able to reliably feed one log after another onto a conveyancing means such as a conveyor belt because empty spaces left on the conveyor belt mean that the mill processor waiting at the downstream end of the conveyor belt is not being fully utilized. Conveyor belts convey the logs resting on them at a uniform speed. Empty spaces on the conveyor belt caused by an inconsistently operating log feeder mean that the downstream mill processor is not working at full or design capacity.

SUMMARY OF THE INVENTION

It has been found that:

(1) a first set of independently actuable lift arms which pivot about a first axis which is:

- (a) located generally beneath a first notched step, and;
- (b) downstream in relation to the point of engagement where the lift arm engages the downstream-most log in the stack of logs; cooperating with (2) a second set of independently actuable lift arms which pivot about a second axis located:

- (a) downstream from the first axis, and
- (b) generally beneath a second notched step, is an improvement over existing unscrambler/sorter devices or existing feeder/indexer devices, or existing combined sorter/indexer devices. It has been found that the use of more than one set of lift arms cooperating with corresponding steps notched in a log ladder not only act to unscramble and sort logs from a pile of logs but also act to feed and index the logs without the need for conventional sorters, as in Hollins, or conventional singulators, as in Stelter.

Use of the present invention to sort, feed and index stacks of twisted, warped or bent logs results in a higher consistency in indexing and feeding logs one at a time on to a conveyancing means such as a conveyor belt than may be achieved by prior art combined sorter/indexers.

It has also been found that using only a single stage of the present invention, that is, only one set of downstream pivoted lifting arms operating from beneath a single notched step as a means for sorting logs from a stack of logs and feeding them in an indexed fashion onto an adjacent conveyancing means such as a conveyor belt has an improved reliability over Hollins type devices used in conjunction with conventional sorters, or over Stelter-type devices used in conjunction with conventional singulators. That is, using a single stage of the present invention results in a greater percentage of the time that a single cycle of engaging the first stage lift arms with a stack of logs will result in a single log being removed from the stack of logs and deposited from the lift arms. Thus using only a single stage log feeder incorporating the present invention, results in the conveyancing means such as a conveyor belt being loaded to a greater percentage of full capacity so that the downstream mill processor is being utilized at that greater percentage of its capacity.

The consistency with which logs are indexed into a stream of end-to-end logs on the conveyor belt when leaving the log ladder of the present invention is increased by adding a second stage, or a multiple array of stages of independently actuable sets of downstream pivoted lift arms. In this arrangement each set of lift arms operates on logs supplied from the adjacent upstream set of lift arms.

Using, for example, a three stage log ladder incorporating the present invention, the log ladder is formed of three adjacent and transversely oriented log cradles which may take the form of notched steps. The log ladder may be a frame comprised of notched longitudinal members supported by lateral cross-members. The notching in the longitudinal members defines the shape of the notched steps (that is, the log cradles).

The spaces between the longitudinal members laterally are covered-in with surface plates called skid plates. The skid plates form generally V-shaped log cradles between the longitudinal members. The skid plates form a skid surface so that logs may be pushed over the skid plates by the action of the lift arms. The skid plates help prevent branches and like protrusions from the logs from getting snagged on the log ladder frame cross members as sometimes occurs with non-covered devices such as the Hollins device. Debris which falls from the logs is allowed to fall from the log ladder through lateral gaps between the skid plates formed along the base of the V-shaped log cradles. The lift arms, being plate-like and generally vertically and longitudinally oriented, act to lift logs without also lifting the associated debris. Thus, unlike the Stelter device, debris is not transported along with the logs.

A downstream-pivoted set of lift arms is disposed beneath each notched step log cradle. Each set of lift arms is independently acreable (for example hydraulically) so that each set of lift arms may be independently raised from a lowered position beneath the notched step to a raised position whereby lifting faces on the lift arms engage a single log from the corresponding notched step and deposit that log into the next adjacent downstream notched step.

In this arrangement, the first stage of the log ladder (that is, the upstream notched step) would typically hold a stack or pile of generally transversely oriented logs. The associated first set of lift arms would then lift a single log from the stack of logs in the first stage notched step and deposit that log into the second stage notched step immediately adjacent downstream of the first stage. The second stage set of lift arms would then transfer that log downstream and deposit it into the third stage notched step. The third stage set of lift arms would then raise that log out of the third stage notched step and deposit it on to a conveyancing means such as a conveyor belt.

The second and third stage notched steps may be fitted with associated sensors to detect when a log has been deposited from the adjacent upstream stage so as to trigger the operation of the associated set of lift arms. If after the first stage set of lift arms has been cycled and no log has been deposited in the second stage then the sensors associated with the second stage trigger a recycling of the first stage set of lift arms until a log is deposited into the second stage.

The process of culling a single log from a plurality of logs held in a notched step is called singulating or indexing the logs. This is accomplished by raising the pivoting lift arms from beneath the notched step. A lifting face on each of the lift arms engages the downstream-most logs and pushes them downstream over the downstream skid plates associated with that notched step. Forcing the logs over the skid plates causes the logs to rotate. In the case of two logs being forced over the skid plates, it has been found that the two logs will rotate in opposite directions to one another such that the log resting directly against the lifting faces rotates in a direction which urges it upwards between the lifting faces and the downstream log. This often causes the upstream log to "pop-up" over the tops of the lifting faces, wherefrom it rolls back into the upstream notched step. Thus a single log is left engaged with the lifting faces and singulating or indexing the logs has successfully been accomplished.

In the event that the first stage lift arms deposit a plurality of logs into the second stage, the second stage set of lift arms cull in a similar fashion a single log from the plurality of logs deposited into the second stage and deposit that single log into the third stage to await feeding by the third stage set of lift arms in an indexed fashion on to the conveyancing means.

Thus the consistency with which logs are deposited onto the conveyancing means is improved above that accomplished by a single stage incorporating lift arms of the present invention. For example, if a single stage device incorporating the present invention will cull a single log and feed it downstream 95 percent of the time, then multiple stages, each having a 95 percent success rate, will operate in conjunction as a singulating log ladder with a reliability improved over that of a single stage operating alone. Consequently, if a multi-stage log ladder of the present invention is employed, the downstream mill processor can be used at close to design capacity rather than under-utilized because of empty spaces on the conveyor belt caused by an inconsistent log sorter, or an inconsistent log feeder/indexer.

A further improvement in the continuous and full utilization of the space available on the conveyor belt, which is the overall object of this invention, is to incorporate hourglass rollers or like lateral log transfer devices into one or more stages of a multiple stage notched step design so that after a log is deposited into that stage it is translated laterally within that stage so as to abut one edge of the log ladder. The edge of the log ladder against which the log is abutted corresponds to the side of the log ladder which is most downstream in the direction of movement of the conveyor belt. Advantageously the hourglass rollers may be incorporated into the downstream-most stage.

A sensor placed adjacent the conveyor belt detects when the log last loaded onto the conveyor belt from the third stage of the log ladder has been conveyed along the conveyor belt so as to just clear the log ladder. This sensor then triggers the next cycle of the third stage set of lift arms which lift the already downstream justified log in the third stage so as to deposit it in very close succession to the previous log on the conveyor belt. This arrangement thus optimizes the loading of the conveyor belt with a stream of end-to-end oriented logs.

BRIEF DESCRIPTION OF THE DRAWINGS

In the drawings, which represent a specific embodiment of the log ladder incorporated in the present invention, but which should not be construed as limiting the scope of the invention in any way.

DETAILED DESCRIPTION OF A PREFERRED EMBODIMENT

Figure 1:
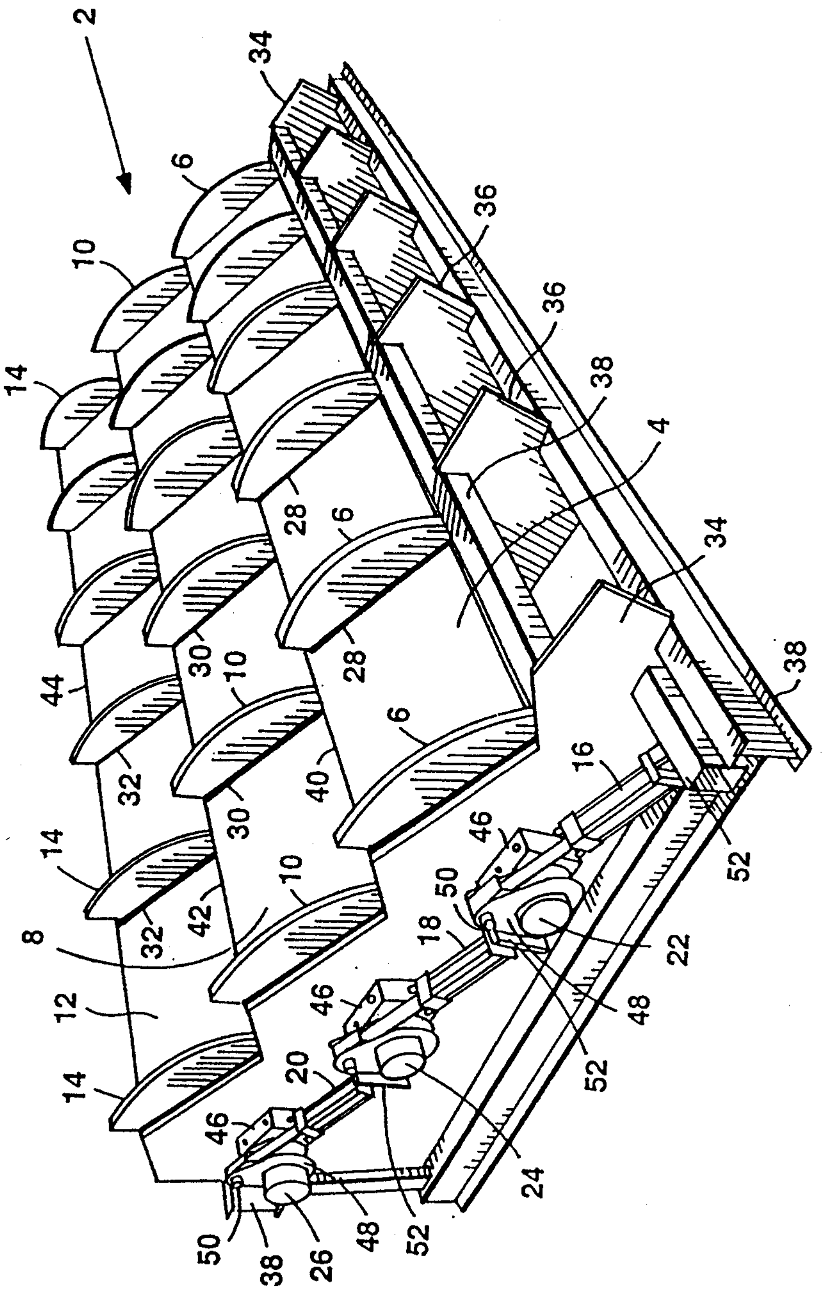
FIG. 1 is a left front perspective view of a three stage log ladder incorporating the present invention.

Referring to FIG. 1, log ladder 2 has first stage log cradle 4 and associated with first stage log cradle 4 an associated set of first stage lift arms 6, a second stage log cradle 8 and an associated set of second stage lift arms 10, and a third stage log cradle 12 and an associated set of third stage lift arms 14. Lift arms 6, 10 and 14 may be raised or lowered by actuating hydraulic rams 16, 18 and 20 respectively. Actuating hydraulic rams 16, 18 and 20 rotate respective associated axles 22, 24 and 26. Lift arms 6 are mounted on axle 22, lift arms 10 are mounted on axle 24, and lift arms 14 are mounted on axle 26 (better seen in FIG. 2) so that actuating independently actuable hydraulic rams 16, 18 and 20 will raise or lower the associated set of lift arms 6, 10 or 14 by pivoting those lift arms about the associated axle 22, 24 or 26. For example, retracting hydraulic ram 16, which is shown in FIG. 1 in its extended position, rotates axle 22 and retracts lift arms 6 into apertures 28 (better shown in FIG. 3) to a lowered position below first stage log cradle 4 (see for example lowered lift arms 14 in FIG. 2).

Likewise, lift arms 10 may be raised or lowered in apertures 30 and lift arms 13 may be raised or lowered in apertures 32.

Sidewalls 34 and supporting members 36 support cross members 38. Cross members 38 support first stage skid plate 40, second stage skid plate 42 and third stage skid plate 44. First stage skid plate 40 has apertures 28 cut therein. Second stage skid plate 42 has apertures 30 cut therein. Third stage skid plate 44 has apertures 32 cut therein.

Axles 22, 24 and 26 are journalled through sidewalls 34 and supporting members 36 and turn in bearings or the like (not shown) contained in bearing mounts 46.

Hydraulic rams 16, 18 and 20 rotate their associated axles 22, 24 and 26 by rotating collars 48 which are affixed to their respective axels 22, 24 and 26, the force of the stroke of hydraulic rams 16, 18 and 20 acting through pins 50 so as to rotate collars 46 and thereby rotate associated axles 22, 24 or 26.

Hydraulic rams 16, 18 and 20, when actuated, thrust against thrust plates 52. Conventional hydraulic lines which attach to hydraulic rams 16, 18 and 20 are not illustrated.

Figure 2:
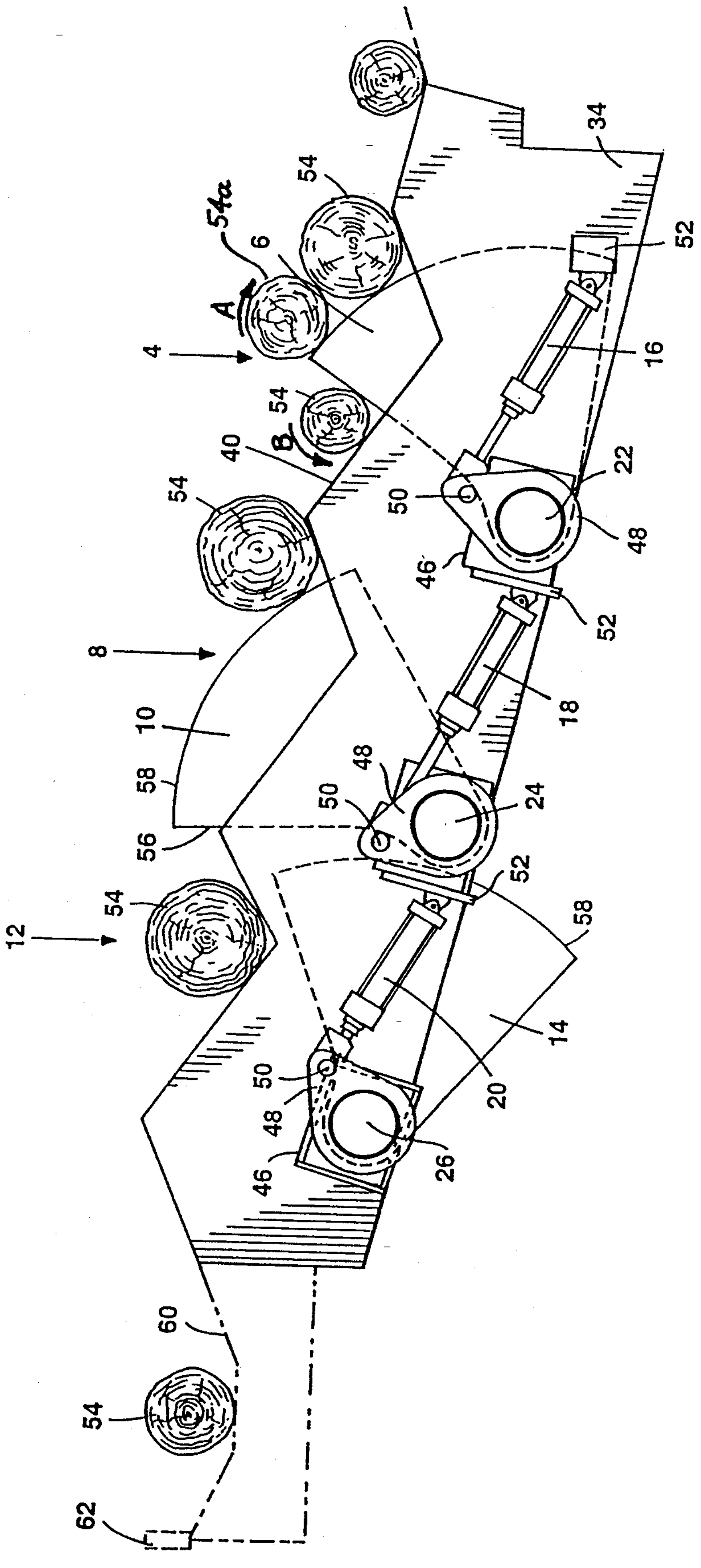
FIG. 2 is a left side elevation view of a three stage log ladder incorporating the present invention.

Referring to FIG. 2, logs 54 are deposited in a generally transversely oriented fashion into first stage log cradle 4. If second stage sensors (not shown) do not detect a log 54 in second stage cradle 8 then hydraulic ram 16 is actuated to raise lift arms 6 and to deposit a log 54 in to first stage log cradle 4. If logs 54 are of small diameter or entangled or otherwise misaligned, lifting faces 56 on lift arms 6 may engage more than one log 54. The log or logs 54 engaged by lifting faces 56 are forced downstream along first stage skid plate 40 as lifting arms 6 are raised.

In FIG. 2, the fully raised position of a set of lift arms is indicated by the illustrated position of lift arms 8. The fully lowered position of a set of lift arms is illustrated by the position of lift arms 14. An intermediary position of a set of lift arms, either while the lift arms are being raised or while the lift arms are being lowered, is illustrated in FIG. 2 by the position of lift arms 6.

When lift arms 6 reach their fully raised position the log or logs 54 which were engaged by lifting faces 56 are deposited into second stage log cradle 8. If, as illustrated, the second stage lifting arms 10 have just finished depositing a log 54 into second stage log cradle 12 and have not yet been lowered, then logs 54 deposited into second stage log cradle 8 by first stage lifting arms 6 are queued in second stage log cradle 8 against upstream face 58 of second stage lifting arms 10. Similarly, logs may be queued upstream of first stage lifting arms 6 and third stage lifting arms 14.

Once second stage lifting arms 10 have retracted from the position illustrated in FIG. 2 to a fully lowered position, log 54 queued against upstream face 58 is allowed to roll fully into second stage log cradle 8 whereupon its presence is detected by the second stage sensors so that if the third stage sensors indicate that there is no log 54 in third stage log cradle 12 then hydraulic ram 18 will actuate to again cycle second stage lift arms 8 thereby moving log 54 downstream along the log ladder so as to deposit log 54 into third stage log cradle 12.

Third stage lifting arms 14 deposit logs 54 onto conveyor belt 60. As illustrated in FIG. 2, conveyor belt 60 is transporting logs 54 transversely relative to log ladder 2 so that in FIG. 2 conveyor belt 60 is to be seen as transporting logs 54 directly in to the page.

Conveyor belt sensor 62 detects when logs 54 have been conveyed by conveyor belts 60 transversely relative to log ladder 2 so that the portion of conveyor belt 60 directly adjacent to third stage log cradle 12 is empty. Hydraulic ram 20 is then triggered to raise third stage lifting arms 14 so as to deposit log 54 from third stage log cradle 12 onto conveyor belt 60.

Figure 3:
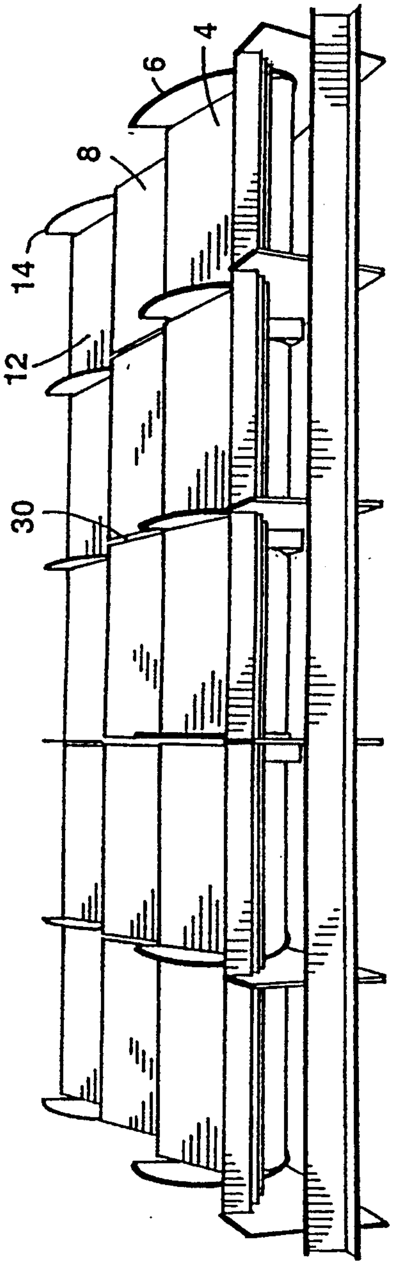
FIG. 3 is a frontal perspective view of a three stage log ladder incorporating the present invention.

FIG. 3 depicts first stage lift arms 6 and third stage lift arms 14 in a fully raised position. Second stage lift arms 10 are fully retracted beneath second stage log cradle 8 and thus cannot be seen below apertures 30.

Figure 4:
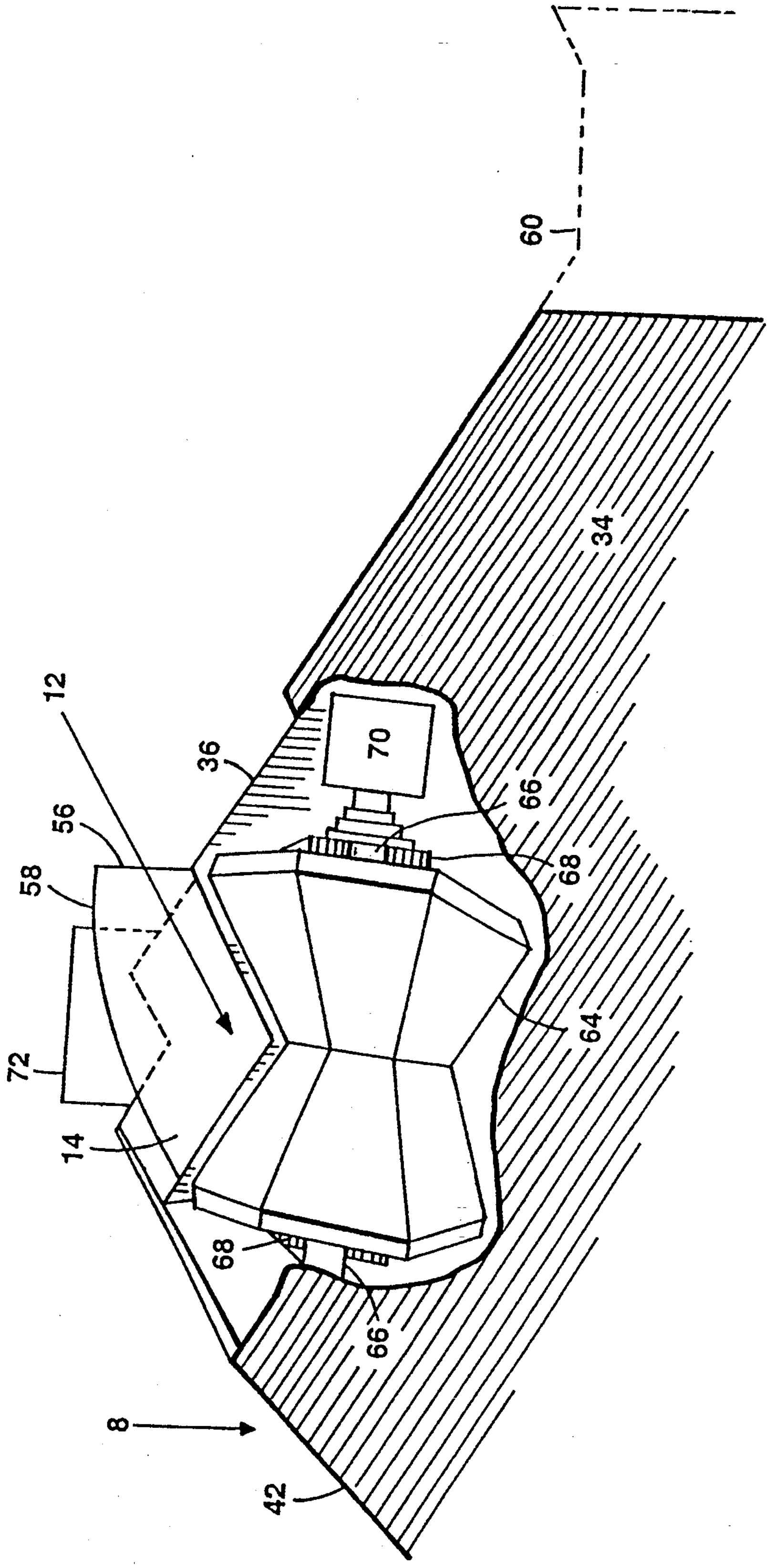
FIG. 4 is a partial cut away view in fight side perspective view of a modified final stage of the log ladder of the present invention.

FIG. 4 illustrates how motorized hourglass rollers 64 may be incorporated into third stage log cradle 12 (only one hourglass roller is depicted but it is understood that there would be a plurality of such rollers in spaced array along third stage log cradle 12). For the sake of clarity, FIG. 4 depicts a simplified view of the log ladder of the present invention incorporating hourglass rollers 64. A first arm 56 in the array of arms 56 is not depicted so that hourglass roller 64 may be clearly seen. It is understood that in the preferred embodiment a first arm 56 would be located between the hourglass roller 64 shown in FIG. 4 and side wall 34 shown partially cut-away. It is also understood that in the preferred embodiment there is an array of hourglass rollers 64 and arms 56 between the hourglass roller 64 depicted and butting plate 72. See, for example, FIG. 5 illustrates a four stage log ladder of the present invention incorporating hourglass rollers 64 in a lateral array within fourth stage cradle 74.

Figure 5:
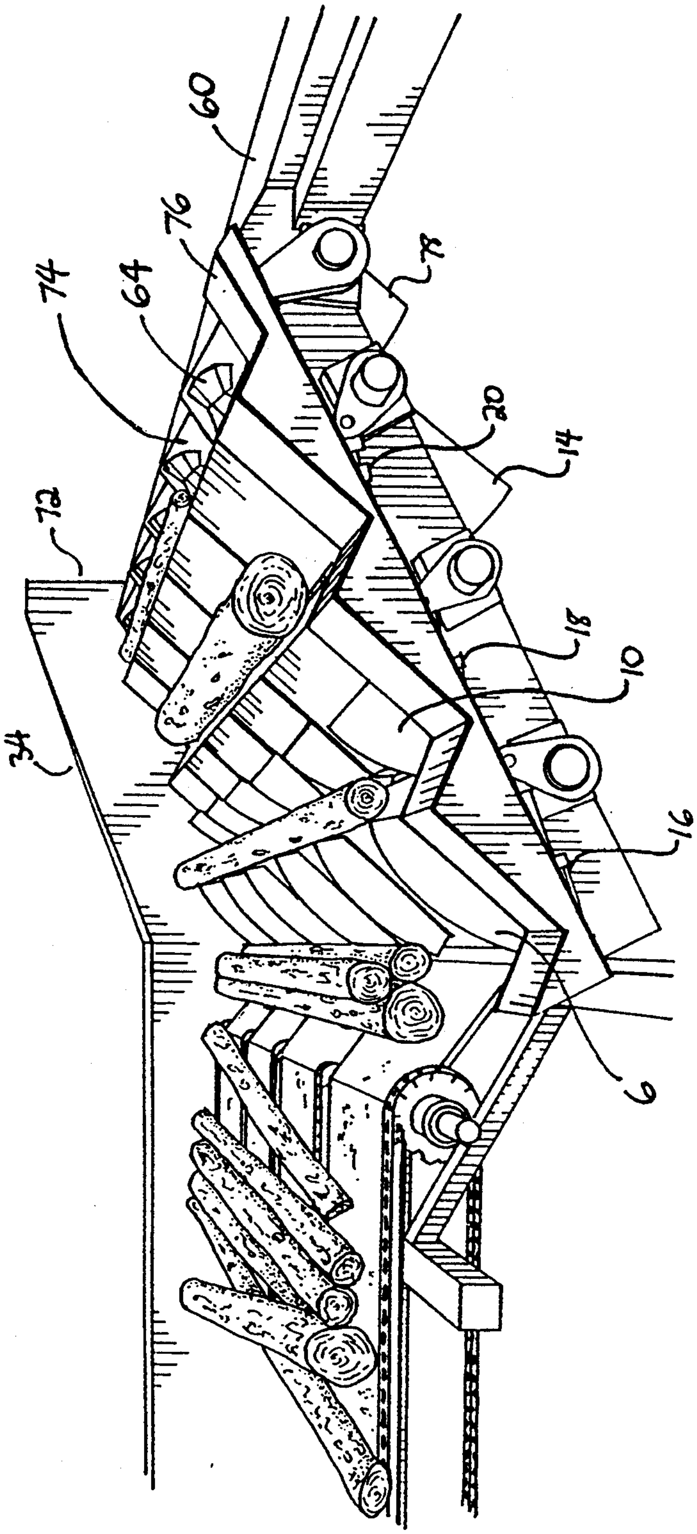
FIG. 5 is a perspective view illustrating a four stage log ladder incorporating the present invention.

In FIG. 5, butting plate 72 is formed as part of raised sidewall 34 and hydraulic rams 16, 18 and 20 and the fourth stage ram (not shown) are covered by protective casing 76. Fourth stage lift arms 78 are shown lowered beneath fourth stage cradle 74. FIG. 5 illustrates what is anticipated to be a typical installation of the present invention in a log mill environment. Indexing is accomplished by lift arms 10 causing logs 54 to rotate in opposite directions labelled as A and B in FIG. 2. In FIG. 2, Rotation A caused log 54*a* to pop-up over lift arms 6 and then drop back into an upstream queued position.

As depicted in FIG. 4, Hourglass rollers 64 are suspended on axle 66. Axle 66 is at one end journalled in supporting mount 68. Support mount 68 is attached to support member 36. The opposed end of axle 66 is journalled within a gearing mechanism and motor unit (not shown) within housing 70. When a log 54 is dropped into third stage log cradle 12 by second stage lifting arms 10, log 54 rolls to the bottom of third stage log cradle 12 so as to come to rest on hourglass rollers 64. Third stage sensors (not shown) detect the presence of log 54 on hourglass rollers 64 and trigger the motor units contained in housings 70. Hourglass rollers 64 are thus rotated so as to transversely translate log 54 until one end of log 54 abuts butting plate 72 which is mounted to one of sidewalls 34. Butting plate 72 is mounted on the sidewall 34, and may approximately correspond to the position of sensor 62 on conveyor belt 60. Hourglass rollers 64 may be asymmetric so that the contour of the roller surfaces conform to the shape of the notched step, that is, so that the roller surfaces act as skid plates.

As will be apparent to those skilled in the art in the light of the foregoing disclosure, many alterations and modifications are possible in the practice of this invention without departing from the spirit or scope thereof. In particular, it is understood that the log ladder of the present invention may include a plurality of stages otherwise than the three stages described as a preferred embodiment. Additional stages may be added depending on the transport distance requirements in a specific mill environment. Also, although the preferred embodiment is depicted as progressively elevating logs 54 as they are fed along log ladder 2, there is no physical requirement that logs 54 have to be progressively elevated. By transposing the cross-sectional shape of the notched steps, log ladder 2 may be oriented to progressively lower logs 54 as the logs are fed along the log ladder. Specifically, skid plates 40, 42, and 44 would become shorter and their corresponding upstream skid plates in their respective log cradles would become longer, allowing log cradle 8 to be lower than log cradle 4 and log cradle 12 to be lower than log cradle 8.

Additionally, it is understood that there is no requirement that hourglass rollers 64 be installed in the downstream-most stage of log ladder 2, although it is advantageous to do so. Hourglass rollers 64 may be installed in any stage of log ladder 2.

Further, it is understood that hourglass rollers 64 may be replaced by optical sensing means using laser light or other light sources for illuminating the logs in the log ladder and in particular locating the lateral position of logs in the last stage of the log ladder. Optical sensing means such as those sold by Newnes Machine Ltd. of Salmon Arm, British Columbia, Canada or optical sensing means such as those sold by Dynamic Systems Incorporated of Vancouver, British Columbia, Canada, may be utilized to detect the lateral position of logs in the last stage of the log ladder and in particular the position of the ends of the logs so that in order to maximize the number of logs on the conveyancing means downstream of the log ladder instead of using hourglass rollers to abut the logs to one constant reference point immediately prior to the last stage lifting arms lifting the log onto the conveyor belt or whatever conveyancing means is being employed, the lifting arms on the last stage of the log ladder may be cycled when as determined by the optical sensing means the last end of the last log just previously placed on the conveyor belt just passes the position of the front of the next log in the last stage of the log ladder, that is the log waiting in the last stage to be placed onto the conveyor belt.

Accordingly, the scope of the invention is to be construed in accordance with the substance defined by the following claims.

What is claimed is:

1. A log ladder for sorting, feeding and sequentially indexing in a downstream direction a stack of logs into a stream of logs comprises, a log cradle and a lifting and culling means, said log cradle oriented transversely to said log ladder, said log cradle adapted to receive and hold logs in a generally transverse orientation to said ladder, wherein said lifting and culling means is adjacent to and downstream of said log cradle and is adapted to (a) cull a log from a plurality of generally transversely oriented logs held in said log cradle; and (b) lift said log from said plurality of logs in said log cradle and deposit said log downstream of said log cradle and from said log ladder, wherein said lifting and culling means comprises a lateral array of lifting arms for engaging and translating said log in a downstream direction from said logs in said log cradle, said lateral array of lifting arms rotatable between a lowered upstream position beneath said log cradle and a raised downstream position, downstream and above said lowered upstream position, wherefrom said log may fall away from said lateral array of lifting arms in a downstream direction, wherein said log cradle has opposed upstream and downstream skid faces forming in longitudinal cross-section "V"-shape and comprising fixed rigid protrusion-free sheeting extending laterally across said log ladder along said log cradle, said upstream and downstream skid faces defining therebetween a transverse elongate aperture extending along said log cradle and said lateral array of lifting arms are pivotable about a pivot located below said downstream skid face of said log cradle, said lateral array of lifting arms selectively rotatable about said pivot by selective active biasing means for selectively actively biasing said lateral array of lifting arms when raising said lateral array of lifting arms to said raised downstream position or when lowering said lateral array of lifting arms to said lowered upstream position, wherein said lateral array of lifting arms comprises a lateral array of generally vertically and longitudinally oriented plates, said plates having lifting faces along an upper downstream edge of each plate and a staging face along an upper upstream edge of each plate, wherein said plates, when pivoted about said pivot from said lowered upstream position to said raised downstream position, are raised through corresponding slots in said upstream and downstream skid faces.

2. The device of claim 1 wherein said upstream and downstream skid faces are planar and said lifting faces further comprising a generally planar portion of said upper downstream edge of each plate, said generally planar portion extending generally radially from said pivot and said staging face along an upper upstream edge of each plate is curved in an arc about said pivot.

3. The device of claim 2 wherein said log ladder further comprises sensing means, cooperating with said lifting and culling means, for triggering said translation of said lateral array of lifting arms from said lowered upstream position to said raised downstream position when said log is transported by a conveyor means from downstream of said log ladder.

4. The device of claim 3 wherein said log cradle comprises log translating means for transversely translating a log when said log, is in said cradle, so as to abut one end of said log against an edge of said log ladder, wherein said log translating means comprises actuable rollers mounted within said log cradle, wherein said rollers are hourglass rollers mounted in lateral array between said upstream and downstream skid faces, and, wherein said log translating means further comprises sensors cooperating with said actuable rollers for sensing the presence of a log in said log cradle and triggering the rotation of said actuable rollers when a log is in said log cradle so as to translate said log over said rotating rollers.

5. A log ladder for sorting, feeding and sequentially indexing in a downstream direction a stack of logs into a stream of logs comprising:

(a) at an upstream end of said log ladder an upstream receiving means, oriented transversely to said log ladder, for receiving and holding in generally transverse orientation a plurality of logs;

(b) along said log ladder, downstream of said upstream end of said log ladder, a spaced and alternating array of (i) lifting and culling means, and (ii) log cradles, each of said log cradles and each of said lifting and culling means in said spaced and alternating array of lifting and culling means and log cradles being oriented transversely to said log ladder, and each of said log cradles being adapted to receive and hold logs in a generally transverse orientation to said log ladder, wherein, at an upstream end of said spaced and alternating array of lifting and culling means and log cradles, a lifting and culling means adjacent to said upstream receiving means for culling one or more logs form said logs in said upstream receiving means and for lifting said logs from said upstream receiving means and depositing said logs into a first log cradle in said spaced and alternating array, said first lifting and culling means cooperating between said upstream receiving means and said first log cradle in said spaced and alternating array, each of the remaining lifting and culling means in said spaced and alternating array cooperating between adjacent log cradles in said spaced and alternating array so as to cull a single log from said first log cradle and thereafter to lift and deposit said single log from an upstream adjacent log cradle to the next adjacent downstream log cradle whereby said single log is passed downstream along said spaced and alternating array, wherein each of said lifting and culling means comprise a lateral array of collectively pivotable arms, each of said collectively pivotable arms having a lifting face, said lateral array of collectively pivotable arms thus comprising a lateral array of lifting faces, said lifting faces for engaging and lifting said single log in a downstream direction along said spaced and alternating array, wherein each of said lateral array of arms are collectively pivotable between a lower upstream position below said upstream adjacent log cradle, and a raised downstream position, above and downstream of said lower upstream position, whereby said lateral array of lifting faces is above said next adjacent downstream log cradle, wherein said lateral array of collectively pivotable arms are collectively pivotable about pivots beneath and generally between said log cradles, and wherein each of said lifting and culling means in said spaced and alternating array are independently actuable and wherein said log cradles comprise opposed upstream and downstream skid faces in a generally "V"-shape in longitudinal cross section, said upstream and downstream skid faces comprising fixed rigid protrusion-free sheeting extending along said log cradles, said upstream and downstream skid faces defining therebetween a transverse elongate aperture extending along said log cradles.

6. The device of claim 5 wherein said upstream receiving means and said upstream and downstream skid faces have longitudinal slots therein, wherein each arm of said collectively pivotable arms comprises a generally vertically and longitudinally oriented plate and said lifting face comprises an upper downstream edge of said plate, and wherein said plate further comprises a staging face along an upper upstream edge of said plate, wherein said pivots are positioned beneath said downstream skid faces, one of said pivots corresponding to (a) each of said downstream skid faces, and (b) each of said lateral array of collectively pivotable arms, whereby when pivoted from said lowered upstream position to said raised downstream position, said plates are pivoted about said pivots and translated through said longitudinal slots.

7. The device of claim 6 wherein said lifting faces further comprise a generally planar portion of said upper downstream edge of each plate, said generally planar portion extending in a generally radial direction from the pivot corresponding to the lateral array of collectively pivotable arms of which said plate forms a part and wherein said staging face along an upper upstream edge of each plate is curved, said curve generally describing an arc about the pivot corresponding to the lateral array of collectively pivotable arms of which said plate forms a part.

8. The device of claim 7 wherein said log ladder comprises first sensing means, cooperating with said lifting and culling means, for triggering translation of said collectively pivotable arms from said lowered upstream position to said raised downstream position.

9. The device of claim 5 wherein a log cradle in said spaced and alternating array of lifting and culling means and log cradles, comprises log translating means for transversely translating a log, so as to abut one end of said log against an edge of said log ladder wherein said log translating means comprises actuable rollers mounted within said downstream-most log cradle, wherein said rollers are hour-glass shaped rollers mounted in lateral array between said upstream and downstream skid faces, and wherein said log translating means further comprises sensors cooperating with said actuable rollers for sensing the presence of said log and triggering the rotation of said actuable rollers so as to translate said log over said rotating rollers.

10. A log ladder for sorting, feeding and indexing in a downstream direction a stack of logs into a stream of logs comprises:

(a) a first notched step of collectively selectively actively actuable lift arms pivotable about a first axis, (b) a second set of collectively actuable lift arms, selectively actively actuable independently of said first set of collectively actuable lift arms, downstream of said first set of lift arms, and pivotable about a second axis, said first set of lift arms selectively actuable between a lowered position and to a raised position whereby said first set of lift arms are engageable with a log at a first engagement point, in said stack of logs wherefrom said log may be raised to said raised position, said first axis downstream of said first engagement point relative to the direction of movement of said logs in said stream of logs, said first axis generally below said first notched step, said first notched step adapted to receive and hold said stack of logs, said first set of lift arms in said raised position positioning said log so as to deposit said log into a second notched step below said first set of lift arms in said raised position and downstream of said first notched step; and said second set of lift arms selectively actuable between a lowered position and a raised position whereby said second set of lift arms are engageable with said log in said second notched step at a second engagement point wherefrom said log may be raised from said second notched step, said second axis downstream of said second engagement point and generally below said second notched step, said second set of lift arms in said raised position positioning said log so as to deposit said log into an adjacent downstream log receiving means, said first and second notched steps further comprising opposed upstream and downstream skid faces in a generally "V"-shape in longitudinal cross section, said upstream and downstream skid faces comprising fixed rigid protrusion-free sheeting extending along said first and second notched steps transversely across said log ladder, said upstream and downstream skid faces defining therebetween a transverse elongate aperture.

* * * * *

UNITED STATES PATENT AND TRADEMARK OFFICE
CERTIFICATE OF CORRECTION

PATENT NO. : 5,423,417

DATED : June 13, 1995

INVENTOR(S) : Stanley W. Redekop

It is certified that error appears in the above-identified patent and that said Letters Patent is hereby corrected as shown below:

| | |
|---|---|
| Column 1, Lines 36-37 | : delete "disc" insert --disk-- |
| Column 3, Line 56 | : delete "acreable" insert --actuable-- |
| Column 5, Line 25 | : delete "fight" insert --right-- |
| Column 6, Line 1 | : delete "axels" insert --axles-- |
| Column 6, Line 55 | : delete "belts" insert --belt-- |
| Column 8, Line 60 | : insert --a generally-- after "cross-section" |
| Column 9, Line 20 | : delete "comprising" insert --comprise-- |
| Column 9, Line 68 | : delete "form" insert --from-- |
| Column 11, Line 30 | : insert --and a first set-- after "step" |
| Column 12, Line 3 | : insert --actively-- after "selectively" |

UNITED STATES PATENT AND TRADEMARK OFFICE
CERTIFICATE OF CORRECTION

PATENT NO. : 5,423,417

DATED : June 13, 1995

INVENTOR(S) : Stanley W. Redekop

It is certified that error appears in the above-indentified patent and that said Letters Patent is hereby corrected as shown below:

Column 12, line 17 : insert --actively-- after "selectively".

Signed and Sealed this

Thirteenth Day of February, 1996

Attest:

BRUCE LEHMAN

*Attesting Officer* *Commissioner of Patents and Trademarks*